No. 810,730. PATENTED JAN. 23, 1906.
H. J. DREAR.
DINNER BUCKET.
APPLICATION FILED MAY 23, 1905.
2 SHEETS—SHEET 2.
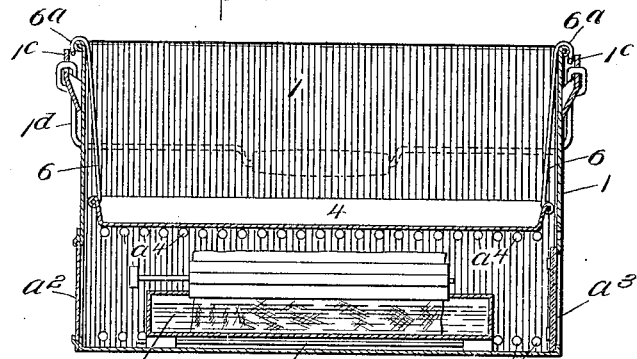
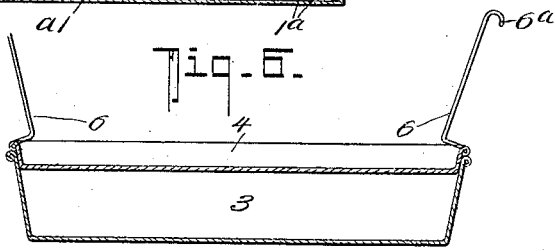
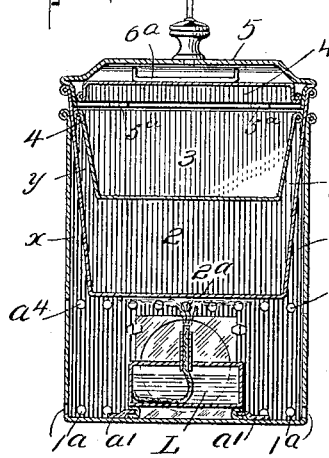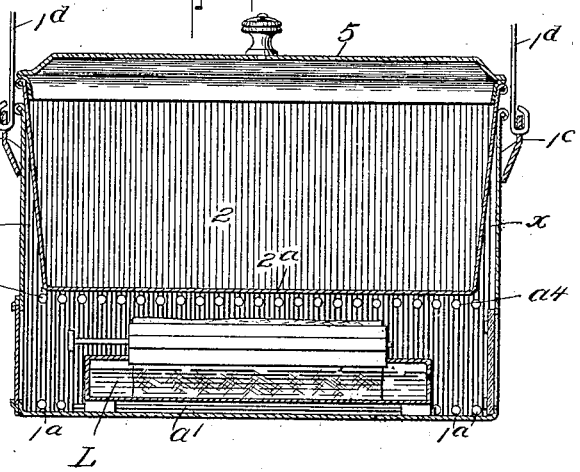
WITNESSES:
F. C. Gibson.
John D. Schrott.
INVENTOR
Harry J. Drear.
BY
Fred G. Dieterich & Co.
ATTORNEYS

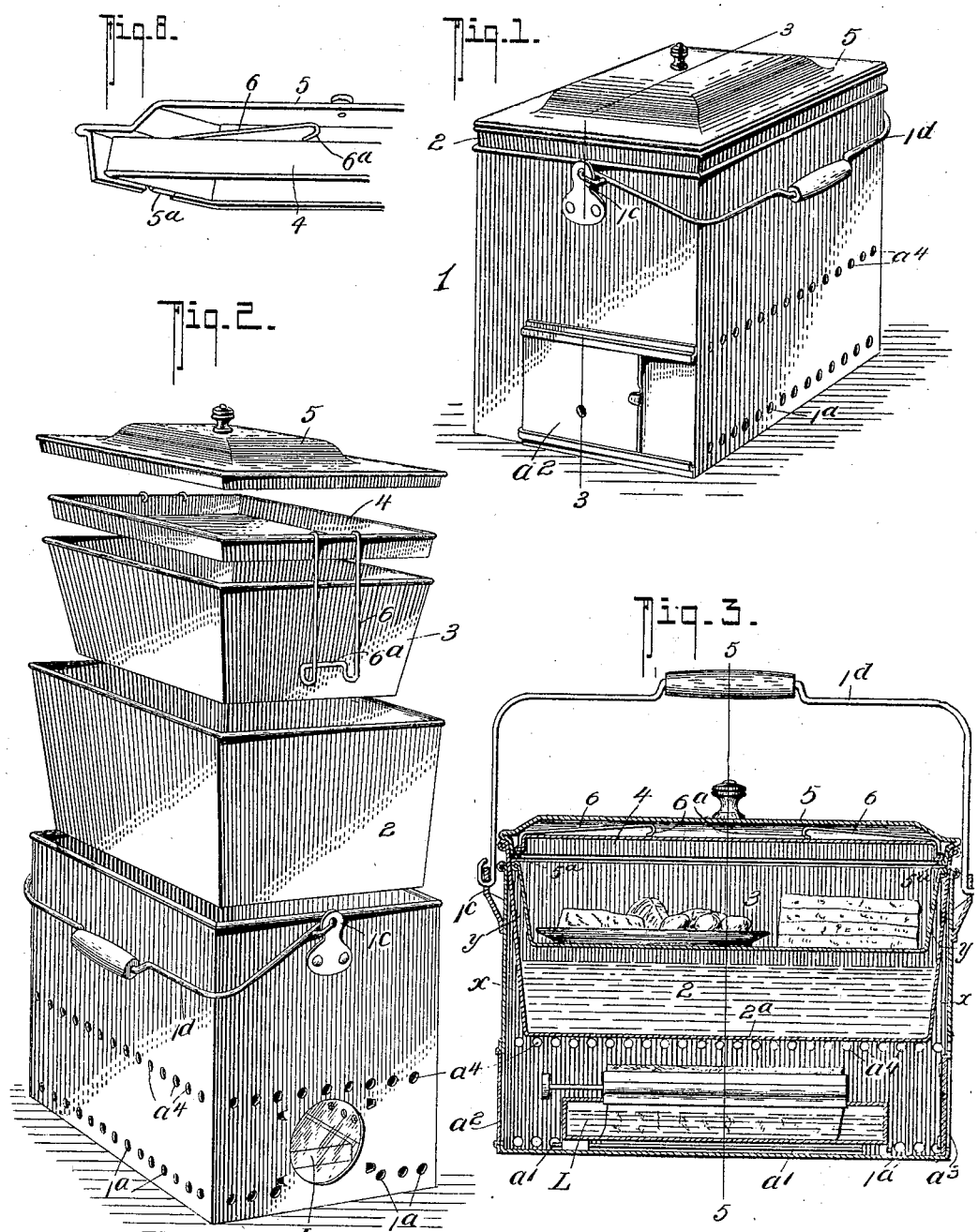

UNITED STATES PATENT OFFICE.

HARRY J. DREAR, OF VANPORT, PENNSYLVANIA, ASSIGNOR OF ONE-HALF TO RICHARD J. OVERTON, OF FREEDOM, PENNSYLVANIA.

DINNER-BUCKET.

No. 810,730.  Specification of Letters Patent.  Patented Jan. 23, 1906.

Application filed May 23, 1905. Serial No. 261,857.

*To all whom it may concern:*

Be it known that I, HARRY J. DREAR, residing at Vanport, in the county of Beaver and State of Pennsylvania, have invented a new and Improved Dinner-Bucket, of which the following is a specification.

My invention embodies certain improvements in that class of dinner buckets or pails in which is embodied a base member adapted to hold a lamp and a series of detachably and telescopically connected pans or receptacles for holding the liquid and solid foods in such manner that the noon-day meal can be conveniently kept warm; and it primarily has for its object to provide an improved dinner-bucket of the kind stated of a simple and economical construction, in which the several members can be so combined and correlatively held with respect to the lamp or heater whereby to obtain a maximum heating effect from a minimum fuel cost and whereby the radiated heat from the several receptacles or compartments is fully utilized in assisting to keep the uppermost ones of the receptacles steamed and otherwise heated.

Among other features my invention comprehends a peculiar combination and arrangement of a deep main receptacle or holder, the bottom of which is formed to receive a shallow lamp or heater and provided with a "bull's-eye" whereby the bucket can be readily utilized as a lantern, a second deep liquid-holding receptacle adapted to fit nearly its full height down into the main receptacle, a third receptacle of less depth than the second receptacle and adapted to be supported from the upper end thereof, a fourth receptacle in the nature of a shallow pan having a rimmed edge, whereby it will readily fit over the third receptacle and form a cover therefor and provided with hinged hangers adapted to engage the ends of the bottom receptacle in such manner as to hold the shallow receptacle over the flame of the lamp-burner, whereby to form a frying-pan, said shallow pan and its hangers being so shaped to snugly fit under a removable top or cover whose rim is arranged to fit down within the upper edges of the second or liquid-holding receptacle, the several parts mentioned having the peculiar construction and combined arrangement hereinafter fully described, specifically pointed out in the appended claims, and illustrated in the accompanying drawings, in which—

Figure 1 is a perspective view of my dinner-bucket, the parts being assembled for carrying. Fig. 2 is a perspective view of the several parts constituting my invention separated. Fig. 3 is a longitudinal section of my bucket, taken substantially on the line 3 3 of Fig. 1. Fig. 4 is a similar view showing the frying-pan supported over the flame. Fig. 5 is a cross-section of the bucket on the line 5 5 of Fig. 3. Fig. 6 is a view showing the uppermost deep receptacle removed with the frying-pan applied as a cover. Fig. 7 shows the other removable receptacle in the main holder with the top in place. Fig. 8 is a detail perspective view, parts being in section, of the cover and the frying-pan supported thereon.

In my construction of dinner-bucket I provide a main holder or bucket portion 1, having a depth nearly that of the complete bucket when the several parts are assembled. At the lower end the bucket 1 has a series of air-inlets $1^a$, which open next the slideways $a'\ a'$ on the bottom of the bucket 1 and which extend from a slide-door $a^2$ in one end of the bucket portion 1 to a bull's-eye opening $a^3$ at the other end of the bucket portion 1, the slideways $a'$ being provided to receive between them a shallow-base lamp L, whose burner end extends up about in a plane with an upper set of air-inlets $a^4$ near the bottom of the bucket member 1. The bull's-eye is provided to permit of using the bucket as a lantern when the workman is in the dark or while going home at night. At the opposite end the bucket 1 has ears $1^c$ to receive the ends of the pail-handle $1^d$ in the usual manner and which in my case is of such height to swing freely above the entire bucket when the parts are assembled, as clearly shown in Fig. 1.

2 designates a deep receptacle or can made slightly flaring toward the top. This can in practice sets in the top of the bucket portion 1 and is of such width and length that its sides and ends bind on the bucket member 1 when the bottom $2^a$ is about in a plane slightly above the upper air-holes $a^4$. It will be apparent that by flaring the member 2, as stated and shown, and the upper part thereof being of slightly greater width and length than the top of the bucket 1, that when the part 2 is set down into the part 1 its upper portion forms a substantially air-tight seal at the upper edge of the bucket part 1, while a hot-air-circulating space x x is provided between the sides and ends of the members 1 and 2. Thus the full effect of the lamp is utilized, and since the heat passes up around the sides as well as under the bottom of the can 2 the liquid contents thereof can be quickly warmed or, in case of making fresh coffee, can be quickly boiled, since the cover 5 is arranged to snugly fit over and close the top of the can 2.

3 designates a third can or holder having its edge arranged to seat upon the inner walls of the can 2 just below the upper edge sufficient to permit of the fitting on of the cover 5. The can 3 is also preferably made slightly tapering, so that spaces y y are formed between the walls of said cans 2 and 3 for the circulation of steam or vapors from the hot liquid in the bottom of the can 2. This is of advantage, since it materially aids in keeping the solid food within can 3 warm, and this result is further developed by reason of the can 3 being located within can 2 so it sets in a plane approximately below the top of bucket portion 1 and below that short extension of the can 2 above the bucket 1.

4 designates a shallow receptacle which has a twofold use, it being mainly useful as a frying-pan and, secondly, useful as a cover for the can 3, and for such purpose it is of slightly less length and width than the top of the can 3, so it can snugly fit in said top and form a closure member therefor, this being of especial advantage when it is desired to keep the food in the can 3 warm while the said can is temporarily removed from the can 2 and the latter is being utilized for heating liquid or other foodstuff, as indicated in Fig. 6. The member 4 when the several parts of the bucket are arranged as shown in Fig. 3 is supported in an inverted position within the cover upon the short inturned flanges 5ª, formed by slitting the lower edge of the cover and bending them in, as best shown in Fig. 8, the said flanges being so arranged that the beaded or turned edges of the member can be readily sprung or forced over said edges, such fitting of the member 4 within the cover serving to give ample space for the contents in the can 3. By reason of the pan 4 being of less length and width than the bucket 1 it is manifest than when the pan 2 is removed from the bucket the pan 4 can be held over the flame of the lamp or heater, as shown in Fig. 4, by reference to which it will be seen that pan 4 is firmly suspended from the opposite ends of the bucket part 1 by the spring-rod-supporting bails 6 6, hinged to the opposite edges of the pan 4 and having claw-hooks 6ª 6ª for gripping the upper edge of the bucket part 1, it being manifest that by reason of the space all around the pan ample air-space is provided to create good draft for the lamp and in consequence a quick frying of the contents of the pan 4, which when the food has been fried can be readily lifted out of the bucket by the hangers 6, which latter when the parts are assembled, as in Fig. 2, can be neatly folded back onto the top of the pan out of the way.

I am aware that it is not new to provide dinner-buckets having a main or bucket portion proper or one or more cans or receptacles arranged to fit into the lower bucket or be supported thereon.

My invention, so far as I know, differentiates from what has heretofore been done in this line of dinner-buckets in the peculiar construction of the cans 2 and 3, their special arrangement for fitting into the main bucket and into each other, and the combined frying-pan and cover member.

Having thus described my invention, what I claim, and desire to secure by Letters Patent, is—

1. A dinner-bucket of the character described, comprising a main bucket member having air-inlets in the lower end, a burner detachably mounted therein, a food-holding pan shaped to project down into the main bucket and to be supported on the upper end thereof, a cover for fitting over the said food-holding pan and a supplemental pan or holder, of less length and width than the other holder, adapted to fit within the said other holder and having means for suspending it from the ends of the main bucket member over the heater when the said other holder is removed from the main bucket portion, the said cover having means for sustaining the said supplemental pan or holder on its under side, as set forth.

2. In a dinner-bucket, comprising a main bucket member, whose bottom is adapted to support a heater, a can or holder detachably supported within the upper end of the main bucket member and a cover for the said can or holder, a shallow pan of less width and length than the can or holder, a means on the cover for detachably supporting the shallow pan within said cover, said pan or holder having means for suspending it from the ends of the main bucket member when removed from said cover, said means being foldable over the said pan when not in use, substantially as shown and described.

3. In a dinner-bucket of the character described, in combination with a deep main bucket member, having its bottom constructed to detachably support a heater, a can or holder formed to be detachably supported on the upper end of the main bucket member to produce an air-tight closure, a second can or holder detachably suspendable within the other holder, a cover for fitting over said holders, a shallow pan adapted to fit in and form a cover for the second-mentioned holder or can and having means whereby it can be detachably suspended within the main bucket member over the heat whereby to form a frying-pan, as set forth.

4. The hereinbefore-described dinner-bucket, which consists of a deep bottom member, a heater removably mounted on the bottom thereof, a flared can or holder adapted to fit down into the bottom member and detachably rest in the upper edge thereof to form a closure member therefor, a second flared can or holder adapted to detachably fit into the other can and form a closure member therefor, a cover that fits over the two cans, and a shallow pan adapted to detachably fit into the top of the second can and form a closure member therefor, said shallow pan having means for detachably suspending it from the upper edge of the deep bottom member directly over the heater when the two aforesaid cans are removed therefrom, and means on the cover for detachably sustaining the shallow pan therein, all being arranged substantially as shown and described.

5. In a dinner-bucket of the character described, in combination with the main or deep member and the heater located on the bottom thereof; a shallow pan of less width and length than the deep pan, means connected to the shallow pan for detachably suspending it from the upper edge of the deep member within said deep member directly over the heater and the cover for the deep pan, said cover having means for removably holding the shallow pan on its under side, for the purposes described.

HARRY J. DREAR.

Witnesses:
R. H. McCaskey,
C. A. Jack.